(12) United States Patent
O'Keefe

(10) Patent No.: US 8,544,741 B2
(45) Date of Patent: Oct. 1, 2013

(54) DATA BLOCK OFFSET ENCODING METHOD FOR COORDINATES

(75) Inventor: Shaun Peter O'Keefe, Victoria (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/313,762

(22) Filed: Dec. 7, 2011

(65) Prior Publication Data

US 2012/0175419 A1 Jul. 12, 2012

(51) Int. Cl.
*G06K 5/00* (2006.01)

(52) U.S. Cl.
USPC ........................................................ 235/437

(58) Field of Classification Search
USPC ................ 235/437, 454, 494, 462.01–462.45
See application file for complete search history.

(56) References Cited

U.S. PATENT DOCUMENTS

| | | | | |
|---|---|---|---|---|
| 6,116,510 A | * | 9/2000 | Nishino | 235/494 |
| 6,141,441 A | * | 10/2000 | Cass et al. | 382/166 |
| 6,398,117 B1 | * | 6/2002 | Oakeson et al. | 235/494 |
| 6,663,008 B1 | | 12/2003 | Pettersson et al. | |
| 7,290,719 B2 | | 11/2007 | Ladas et al. | |
| 7,324,662 B2 | * | 1/2008 | Kot et al. | 382/100 |
| 2005/0259844 A1 | * | 11/2005 | Kot et al. | 382/100 |
| 2008/0222492 A1 | * | 9/2008 | Earhart et al. | 714/774 |

\* cited by examiner

*Primary Examiner* — Thien M Le
(74) *Attorney, Agent, or Firm* — Canon U.S.A., Inc. IP Division

(57) ABSTRACT

A barcode includes a plurality of blocks arranged to define a coordinate system across the barcode. A method determines sizes of at least first and second blocks into which arbitrary information is to be encoded such that the blocks have a pair-wise anharmonic relationship with each other. A first portion of the arbitrary information to be encoded in the first block and a second portion of the arbitrary information to be encoded in the second block are then selected. The method encodes the first portion and the second portion, and provides a decode verification mechanism in each of the first and second blocks. A plurality of the encoded first blocks and a plurality of the encoded second blocks are arranged to form a barcode and to define a coordinate system therein, whereupon the barcode may be stored to a memory device.

18 Claims, 15 Drawing Sheets

DATA BLOCK OFFSET ENCODING METHOD FOR COORDINATES

REFERENCE TO RELATED PATENT APPLICATION(S)

This application claims the benefit under 35 U.S.C. §119 of the filing date of Australian Patent Application No. 2010257220, filed Dec. 15, 2010, hereby incorporated by reference in its entirety as if fully set forth herein.

TECHNICAL FIELD

The present invention relates to barcodes and, in particular, to the computer generation of barcodes using data block offset encoding.

BACKGROUND

In the field of printed content management, it is often desirable to be able to define a persistent coordinate system over a printed document, the coordinate system being physically imprinted on the document through printing or some similar process. Provided the coordinate system is consistent throughout the lifetime of the document, it may be used to uniquely identify and reference areas on the document, which are, from a security or document workflow point of view, of particular importance.

This coordinate system is usually represented using a two-dimensional (2D) barcode, that is printed on the document using ink or toner. By combining coordinate system information in the barcode with information about the location and type of regions of importance on the document, the document can be considered self-contained, thereby permitting the document to be processed without referring to a central source of information. Such a document has application in numerous areas, including document access control, workflow processing and document verification.

It is particularly desirable that the physical representation of the coordinate system on the document does not interfere with the actual content of the document. In the case that the physical representation is printed on the document using ink or toner, it is preferable that the representation have low-visibility, or even be invisible, for example formed using infrared ink or the like.

One method for generating such a self-contained document involves encoding a tiled maximum length code in a 2D barcode across the surface of the document. The coordinates of each information carrying indicia on the barcode may be calculated by observing the offset of codes in adjacent columns of indicia. The coordinates are implicitly encoded in the offset between columns. Provided the maximum length code is known to both the encoder and the decoder, the coordinate system can be recovered. Arbitrary data can then be encoded by allotting a number of the indicia for this purpose, with coordinate system data and arbitrary data being interleaved across the page.

Another method for generating such a self-contained document consists of encoding a pseudo-random sequence in a 2D barcode encoded across the face of the document. On decoding, provided the decoder knows the pseudo-random sequence encoded in the barcode, for example by knowing the seed from which the pseudo-random sequence was generated, and the pseudo-random sequence does not repeat within the document, then the position of each encoded value in the sequence provides a coordinate system by which to address the document. Like the previously mentioned method, arbitrary data may also be encoded by interleaving arbitrary data with the coordinate data.

SUMMARY

Disclosed is a computer-implemented method for encoding arbitrary information in a barcode, the barcode comprising a plurality of blocks arranged to define a coordinate system across the barcode. The method determines sizes of at least first and second blocks into which the arbitrary information is to be encoded such that the blocks have a pair-wise anharmonic relationship with each other. A first portion of the arbitrary information to be encoded in the first block and a second portion of the arbitrary information to be encoded in the second block are then selected. The method encodes the first portion of the arbitrary information in the first block and the second portion of the arbitrary information in the second block, and provides a decode verification mechanism in each of the first and second blocks. A plurality of the encoded first blocks and a plurality of the encoded second blocks are then arranged to form a barcode and to define a coordinate system therein, whereupon the barcode may be stored to a memory device. Once stored the barcode may be readily printed upon a document.

Desirably the encoding comprises forming the decode verification mechanism from the arbitrary information, arranging the first portion and the decode verification mechanism into the first block, and arranging the second portion and the decode verification mechanism into the second block. The decode verification mechanism preferably has at least a first part and a second part, and the first part is arranged with the first portion into the first block and the second part is arranged with the second portion into the second block. Advantageously, the first part is determined from the first portion and the second part is determined from the second portion. Further the decode verification mechanism may comprise error correction data determined for each of the selected first and second portions of the arbitrary information.

In a further implementation the decode verification mechanism comprises error correction data determined from the arbitrary information. Desirably the arbitrary information is formed from at least one of location data of at least one region of a document to be protected with the barcode, and content of at least one such region. Further advantageously the arbitrary information is formed as arbitrary information data from a combination of plural location data of at least one said region and content of said one region, and associated with the portions of arbitrary information is a corresponding error correction code for arranging in respective ones of the blocks.

Preferably, the blocks are sized to be pair-wise co-prime.

According to another aspect, there is disclosed a computer-implemented method for decoding arbitrary information and determining coordinate information in a barcode comprising a plurality of blocks, the barcode being formed on a document. This method decodes from an image of the document at least a portion of the barcode using a decode verification mechanism to recover arbitrary information in a first block and second block of the barcode. An arrangement of a plurality of the first blocks and a plurality of the second blocks is then determined based on the position of the decoded first block and the position of the decoded second block. This method then determines coordinate information using the position of each first block relative to a respective second block and an anharmonic relationship of the blocks.

Desirably the position of each decoded first block is an offset from the position of a respective decoded second block.

Preferably, the decoding step comprises demodulating the barcode to recover a virtual grid associated therewith, separating the virtual grid of the demodulated barcode into a plurality of channels, and recovering locations of the blocks tiled across each of the channels.

The recovering step may comprise, for each block of the barcode, the steps of identifying a point of interest to establish an offset, selecting a block associated with the established offset, decoding the selected block and assessing the decoding using the decode verification mechanism, where the decoding is successful, recording the offset for the block, and where the decoding is not successful, updating the offset and repeating step (iii). Preferably, the determining of the arrangement and of the coordinate information is based upon the determined offsets.

Other aspects are also disclosed

BRIEF DESCRIPTION OF THE DRAWINGS

At least one embodiment of the present invention will now be described with reference to the following drawings, in which.

DETAILED DESCRIPTION INCLUDING BEST MODE

When combining both coordinate data and arbitrary data into a single barcode to generate a self-contained document, it is often desirable to minimise the amount of barcode bandwidth used to encode coordinate information. For applications such as anti-tamper, document content access management, and workflow control, a large amount of data is generally required to describe the operations to be completed.

In prior methods, the majority of information is either stored offline in a central data server, and is recovered once the document has been identified through the coordinate information encoded on the document, or is stored on the document in a condensed format. That is, there was generally a compromise between functionality and self-containment, the degree of which was decided by the amount of data capacity available for encoding arbitrary information in the barcode.

Presently disclosed is an encoding scheme for combining both coordinate information and arbitrary information into a single 2D barcode where, provided the arbitrary information is arranged in an appropriate fashion, no actual barcode bandwidth is required to encode the coordinate system information. Instead, the coordinate system information is inferred from the arrangement of the arbitrary information on the document. This releases most and preferably all of the barcode for encoding arbitrary information, vastly improving the functionality of the self-contained document.

Figure 14A:
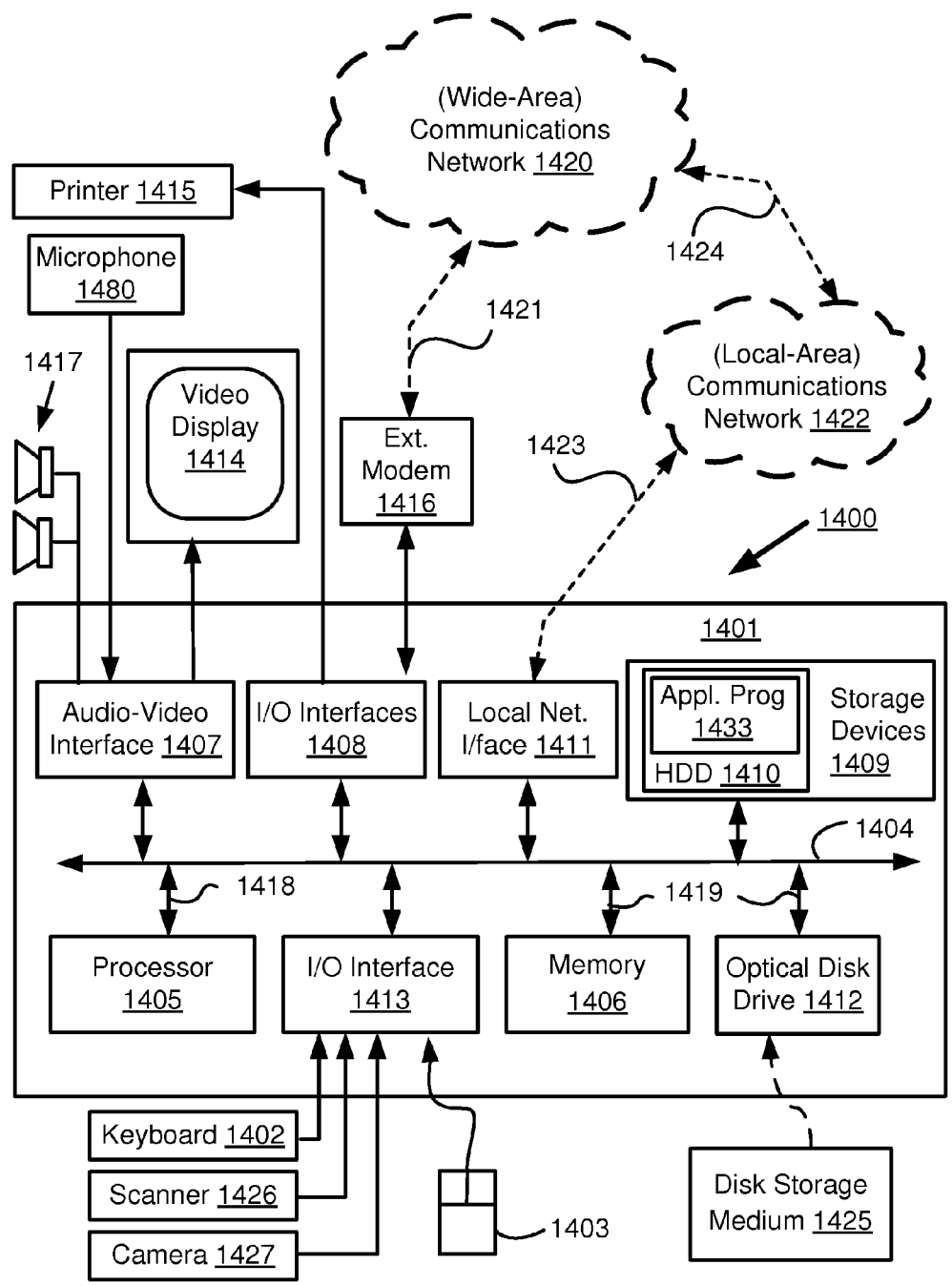
FIGS. 14A and 14B form a schematic block diagram of a general purpose computer system upon which arrangements described can be practiced.
Figure 14B:
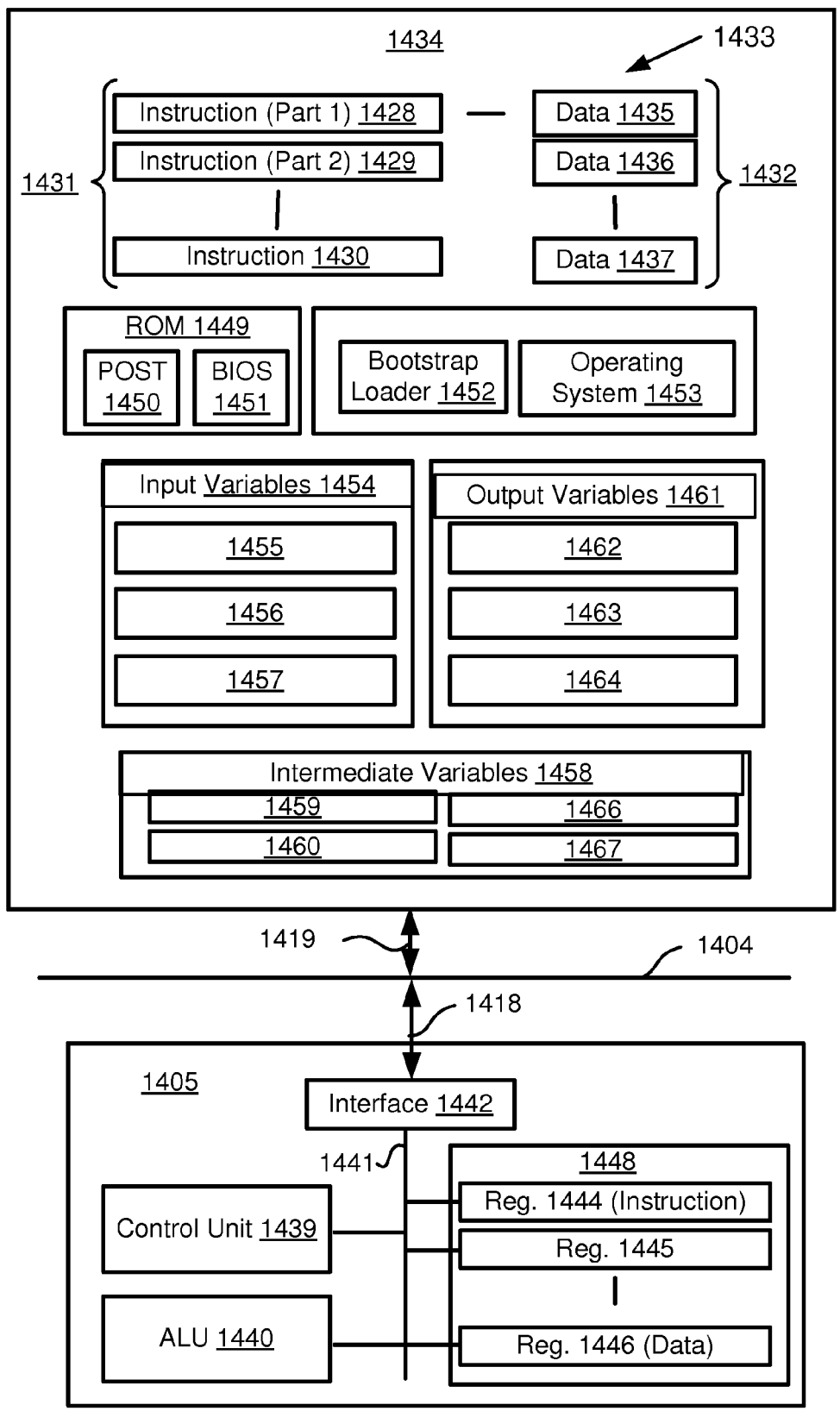

FIGS. 14A and 14B depict a general-purpose computer system 1400, upon which the various arrangements to be described can be practiced.

As seen in FIG. 14A, the computer system 1400 includes: a computer module 1401; input devices such as a keyboard 1402, a mouse pointer device 1403, a scanner 1426, a camera 1427, and a microphone 1480; and output devices including a printer 1415, a display device 1414 and loudspeakers 1417. The printer 1415 may be used to print a barcode onto a medium such as paper, thus representing an encoded output. The scanner 1426 may be used to scan a document including a barcode for decoding of information contained therein by the computer module 1410. An external Modulator-Demodulator (Modem) transceiver device 1416 may be used by the computer module 1401 for communicating to and from a communications network 1420 via a connection 1421. The communications network 1420 may be a wide-area network (WAN), such as the Internet, a cellular telecommunications network, or a private WAN. Where the connection 1421 is a telephone line, the modem 1416 may be a traditional "dial-up" modem. Alternatively, where the connection 1421 is a high capacity (e.g., cable) connection, the modem 1416 may be a broadband modem. A wireless modem may also be used for wireless connection to the communications network 1420.

The computer module 1401 is a computerized apparatus that typically includes at least one processor unit 1405, and a memory unit 1406. For example, the memory unit 1406 may have semiconductor random access memory (RAM) and semiconductor read only memory (ROM). The computer module 1401 also includes an number of input/output (I/O) interfaces including: an audio-video interface 1407 that couples to the video display 1414, loudspeakers 1417 and microphone 1480; an I/O interface 1413 that couples to the keyboard 1402, mouse 1403, scanner 1426, camera 1427 and optionally a joystick or other human interface device (not illustrated); and an interface 1408 for the external modem 1416 and printer 1415. In some implementations, the modem 1416 may be incorporated within the computer module 1401, for example within the interface 1408. The computer module 1401 also has a local network interface 1411, which permits coupling of the computer system 1400 via a connection 1423 to a local-area communications network 1422, known as a Local Area Network (LAN). As illustrated in FIG. 14A, the local communications network 1422 may also couple to the wide network 1420 via a connection 1424, which would typically include a so-called "firewall" device or device of similar functionality. The local network interface 1411 may comprise an Ethernet™ circuit card, a Bluetooth™ wireless arrangement or an IEEE 802.11 wireless arrangement; however, numerous other types of interfaces may be practiced for the interface 1411.

The I/O interfaces 1408 and 1413 may afford either or both of serial and parallel connectivity, the former typically being implemented according to the Universal Serial Bus (USB) standards and having corresponding USB connectors (not illustrated). Storage devices 1409 are provided and typically include a hard disk drive (HDD) 1410. Other storage devices such as a floppy disk drive and a magnetic tape drive (not illustrated) may also be used. An optical disk drive 1412 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1400.

The components 1405 to 1413 of the computer module 1401 typically communicate via an interconnected bus 1404 and in a manner that results in a conventional mode of operation of the computer system 1400 known to those in the relevant art. For example, the processor 1405 is coupled to the system bus 1404 using a connection 1418. Likewise, the memory 1406 and optical disk drive 1412 are coupled to the system bus 1404 by connections 1419. Examples of computers on which the described arrangements can be practised include IBM-PC's and compatibles, Sun Sparcstations, Apple Mac™ or a like computer systems.

The methods of encoding arbitrary information in a barcode and of decoding arbitrary information and coordinate information from a barcode, to be described, may be implemented using the computer system 1400 wherein the processes of FIGS. 1 to 13, to be described, may be implemented as one or more software application programs 1433 executable within the computer system 1400. In particular, the steps of the barcoding methods are effected by instructions 1431 (see FIG. 14B) in the software 1433 that are carried out within the computer system 1400. The software instructions 1431 may be formed as one or more code modules, each for performing one or more particular tasks. The software may also be divided into two separate parts, in which a first part and the corresponding code modules performs the encoding and decoding methods, and a second part and the corresponding code modules manage a user interface between the first part and the user.

The software may be stored in a computer-readable medium, including the storage devices described below, for example. The software is loaded into the computer system 1400 from the computer readable medium, and then executed by the computer system 1400. A computer readable medium having such software or computer program recorded on the computer readable medium is a computer program product. The use of the computer program product in the computer system 1400 preferably effects an advantageous apparatus for encoding and decoding arbitrary information in a barcode.

The software 1433 is typically stored in the HDD 1410 or the memory 1406. The software is loaded into the computer system 1400 from a computer readable medium, and executed by the computer system 1400. Thus, for example, the software 1433 may be stored on an optically readable disk storage medium (e.g., CD-ROM) 1425 that is read by the optical disk drive 1412. A computer readable medium having such software or computer program recorded on it is a computer program product. The use of the computer program product in the computer system 1400 preferably effects an apparatus for barcode encoding and barcode decoding.

In some instances, the application programs 1433 may be supplied to the user encoded on one or more CD-ROMs 1425 and read via the corresponding drive 1412, or alternatively may be read by the user from the networks 1420 or 1422. Still further, the software can also be loaded into the computer system 1400 from other computer readable media. Computer-readable storage media refers to any non-transitory tangible storage medium that provides recorded instructions and/or data to the computer system 1400 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1401. Examples of transitory or non-tangible computer-readable transmission media that may also participate in the provision of software, application programs, instructions and/or data to the computer module 1401 include radio or infra-red transmission channels as well as a network connection to another computer or networked device, and the Internet or Intranets including e-mail transmissions and information recorded on Websites and the like.

The second part of the application programs 1433 and the corresponding code modules mentioned above may be executed to implement one or more graphical user interfaces (GUIs) to be rendered or otherwise represented upon the display 1414. Through manipulation of typically the keyboard 1402 and the mouse 1403, a user of the computer system 1400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1417 and user voice commands input via the microphone 1480.

FIG. 14B is a detailed schematic block diagram of the processor 1405 and a "memory" 1434. The memory 1434 represents a logical aggregation of all the memory modules (including the HDD 1409 and semiconductor memory 1406) that can be accessed by the computer module 1401 in FIG. 14A.

When the computer module 1401 is initially powered up, a power-on self-test (POST) program 1450 executes. The POST program 1450 is typically stored in a ROM 1449 of the semiconductor memory 1406 of FIG. 14A. A hardware device such as the ROM 1449 storing software is sometimes referred to as firmware. The POST program 1450 examines hardware within the computer module 1401 to ensure proper functioning and typically checks the processor 1405, the memory 1434 (1409, 1406), and a basic input-output systems software (BIOS) module 1451, also typically stored in the ROM 1449, for correct operation. Once the POST program 1450 has run successfully, the BIOS 1451 activates the hard disk drive 1410 of FIG. 14A. Activation of the hard disk drive 1410 causes a bootstrap loader program 1452 that is resident on the hard disk drive 1410 to execute via the processor 1405. This loads an operating system 1453 into the RAM memory 1406, upon which the operating system 1453 commences operation. The operating system 1453 is a system level application, executable by the processor 1405, to fulfil various high level functions, including processor management, memory management, device management, storage management, software application interface, and generic user interface.

The operating system 1453 manages the memory 1434 (1409, 1406) to ensure that each process or application running on the computer module 1401 has sufficient memory in which to execute without colliding with memory allocated to another process. Furthermore, the different types of memory available in the system 1400 of FIG. 14A must be used properly so that each process can run effectively. Accordingly, the aggregated memory 1434 is not intended to illustrate how particular segments of memory are allocated (unless otherwise stated), but rather to provide a general view of the memory accessible by the computer system 1400 and how such is used.

As shown in FIG. 14B, the processor 1405 includes a number of functional modules including a control unit 1439, an arithmetic logic unit (ALU) 1440, and a local or internal memory 1448, sometimes called a cache memory. The cache memory 1448 typically include a number of storage registers 1444-1446 in a register section. One or more internal busses 1441 functionally interconnect these functional modules. The processor 1405 typically also has one or more interfaces 1442 for communicating with external devices via the system bus 1404, using a connection 1418. The memory 1434 is coupled to the bus 1404 using a connection 1419.

The application program 1433 includes a sequence of instructions 1431 that may include conditional branch and loop instructions. The program 1433 may also include data 1432 which is used in execution of the program 1433. The instructions 1431 and the data 1432 are stored in memory locations 1428, 1429, 1430 and 1435, 1436, 1437, respectively. Depending upon the relative size of the instructions 1431 and the memory locations 1428-1430, a particular instruction may be stored in a single memory location as depicted by the instruction shown in the memory location 1430. Alternately, an instruction may be segmented into a number of parts each of which is stored in a separate memory location, as depicted by the instruction segments shown in the memory locations 1428 and 1429.

In general, the processor 1405 is given a set of instructions which are executed therein. The processor 1105 waits for a subsequent input, to which the processor 1405 reacts to by executing another set of instructions. Each input may be provided from one or more of a number of sources, including data generated by one or more of the input devices 1402, 1403, data received from an external source across one of the networks 1420, 1402, data retrieved from one of the storage devices 1406, 1409 or data retrieved from a storage medium 1425 inserted into the corresponding reader 1412, all depicted in FIG. 14A. The execution of a set of the instructions may in some cases result in output of data. Execution may also involve storing data or variables to the memory 1434.

The disclosed barcode encoding and decoding arrangements use input variables 1454, which are stored in the memory 1434 in corresponding memory locations 1455, 1456, 1457. The barcode encoding and decoding arrangements produce output variables 1461, which are stored in the memory 1434 in corresponding memory locations 1462, 1463, 1464. Intermediate variables 1458 may be stored in memory locations 1459, 1460, 1466 and 1467.

Referring to the processor 1405 of FIG. 14B, the registers 1444, 1445, 1446, the arithmetic logic unit (ALU) 1440, and the control unit 1439 work together to perform sequences of micro-operations needed to perform "fetch, decode, and execute" cycles for every instruction in the instruction set making up the program 1433. Each fetch, decode, and execute cycle comprises:

(a) a fetch operation, which fetches or reads an instruction 1431 from a memory location 1428, 1429, 1430;

(b) a decode operation in which the control unit 1439 determines which instruction has been fetched; and (c) an execute operation in which the control unit 1439 and/or the ALU 1440 execute the instruction.

Thereafter, a further fetch, decode, and execute cycle for the next instruction may be executed. Similarly, a store cycle may be performed by which the control unit 1439 stores or writes a value to a memory location 1432.

Each step or sub-process in the processes of FIGS. 1-14 is associated with one or more segments of the program 1433 and is performed by the register section 1444, 1445, 1447, the ALU 1440, and the control unit 1439 in the processor 1405 working together to perform the fetch, decode, and execute cycles for every instruction in the instruction set for the noted segments of the program 1433.

Encoding a Self-Contained Document

Figure 5:
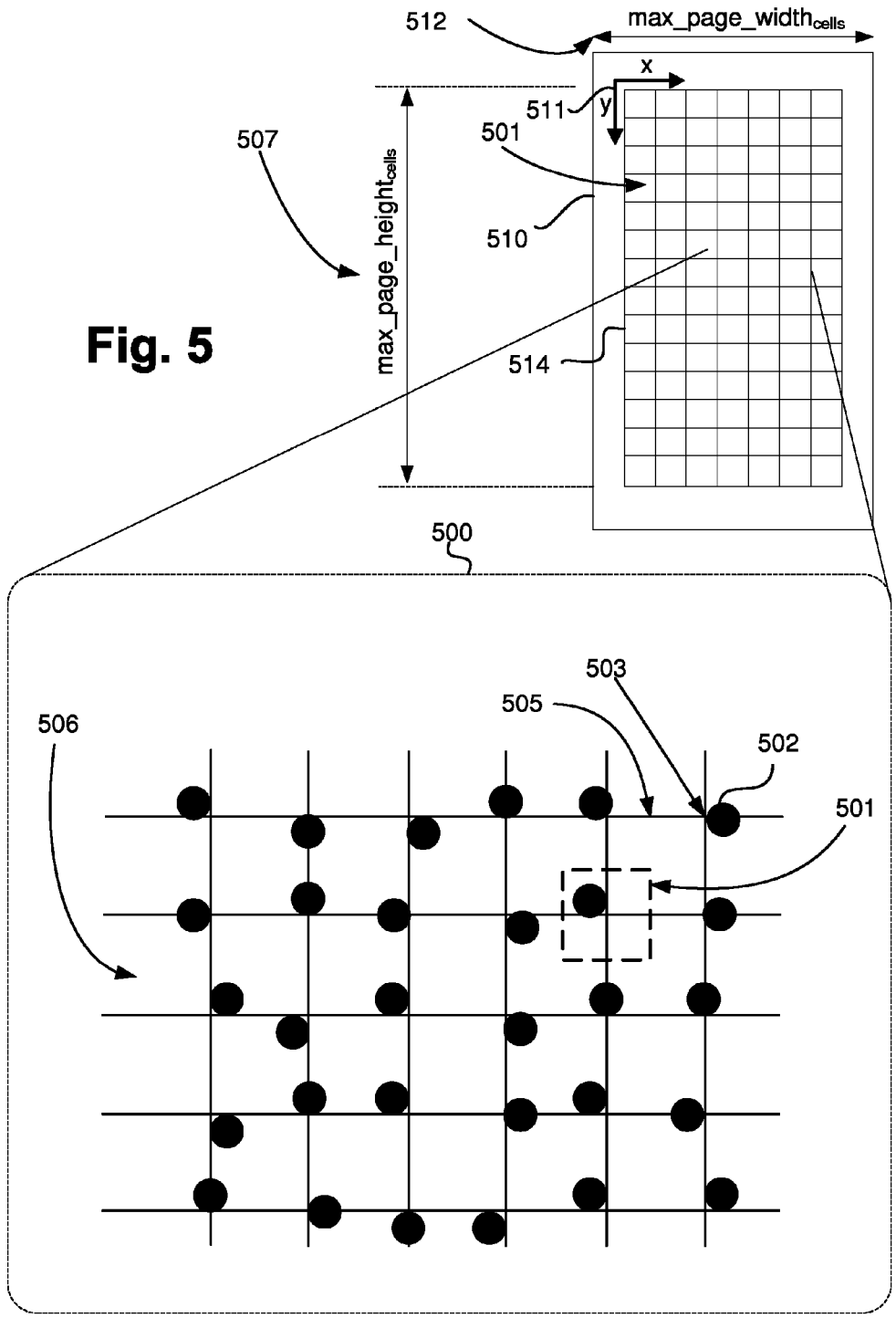
FIG. 5 is a schematic block diagram illustrating a self-contained document with an associated two-dimensional barcode.

A self-contained document 510 is shown in FIG. 5. The self-contained document 510 is encoded with a 2D barcode 514. While there are a number of appropriate encoding schemes available for the 2D barcode 514, a preferred implementation utilizes a low visibility dot barcode 500, seen blown-up in FIG. 5. The dot barcode 500 is formed of an array 506 of data dots 502 spread across the self-contained document 510. Each data dot 502 is modulated away from a nominal position 503 on a virtual 2D grid 505. In this example, the nominal position 503 is an intersection of the 2D grid 505.

Figure 6:
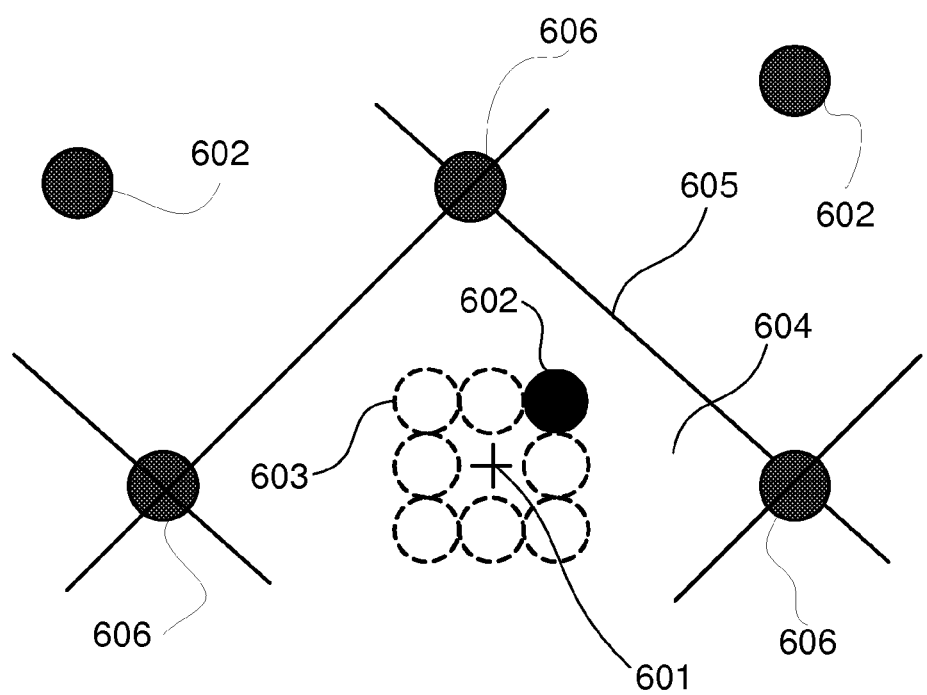
FIG. 6 is a schematic block diagram illustrating a modulation scheme for the dots of a two-dimensional dot barcode.

A particular modulation scheme is shown in detail in FIG. 6. By modulating each of the data dots 602 to one of a number of set modulation positions 603 away from a nominal position 601, within a virtual cell 604 of the 2D grid 605, information is encoded in the barcode. In this example, the nominal position 601 is centered in the cell 604 and thus displaced from the intersections of the virtual grid 605. In this example, each of the data dots is surrounded by four alignment dots 606. The alignment dots are added for ease of decoding. Alignment dots are different from data dots in that they are not modulated away from their nominal positions and hence do not carry data. Alignment dots are shown in FIG. 6 for completeness but are excluded from other figures (e.g. FIG. 5) for the sake of easy understanding. In the preferred implementation of FIG. 5, the nominal positions 503 are spaced apart by 39.6 pixels (based on a diagonal spacing of 14 pixels between each data dot 602 and its adjacent alignment dots 606) at a print resolution of 600 dots per inch. In another implementation, the grid 505 may be rotated by 45 degrees. This is a measure which can be taken to decrease the perceived density of the barcode and limit the impact of the barcode on the readability of the document.

Figure 1:
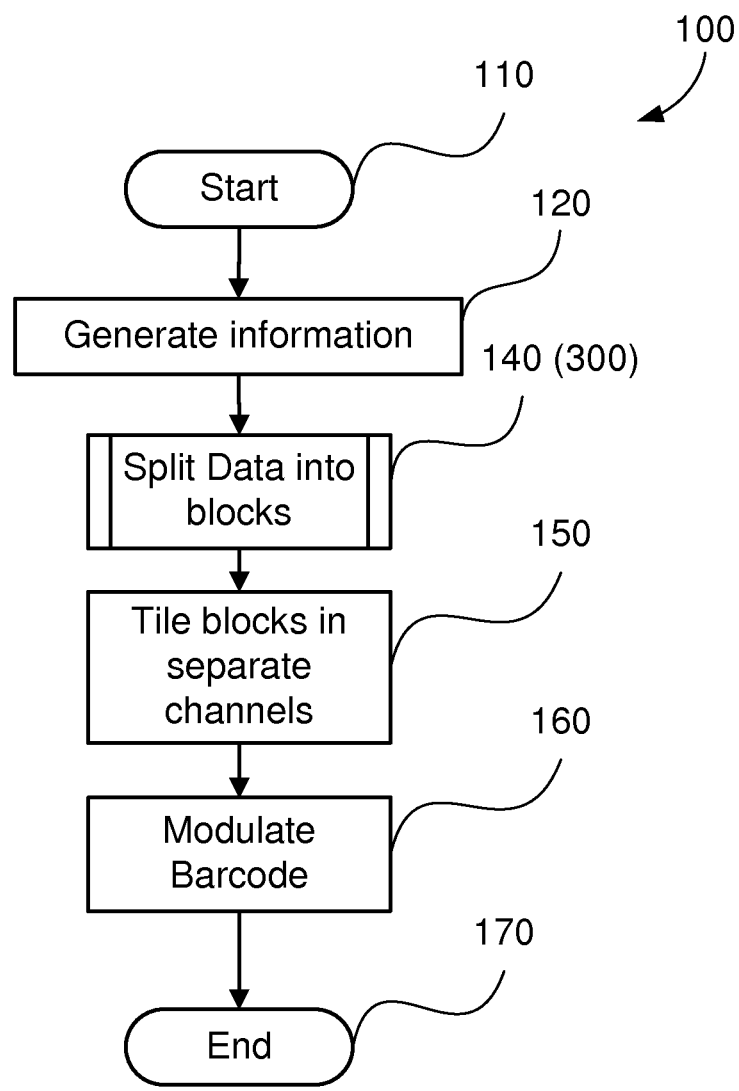
FIG. 1 is a schematic flow diagram illustrating a method of encoding a self-contained document.
Figure 7:
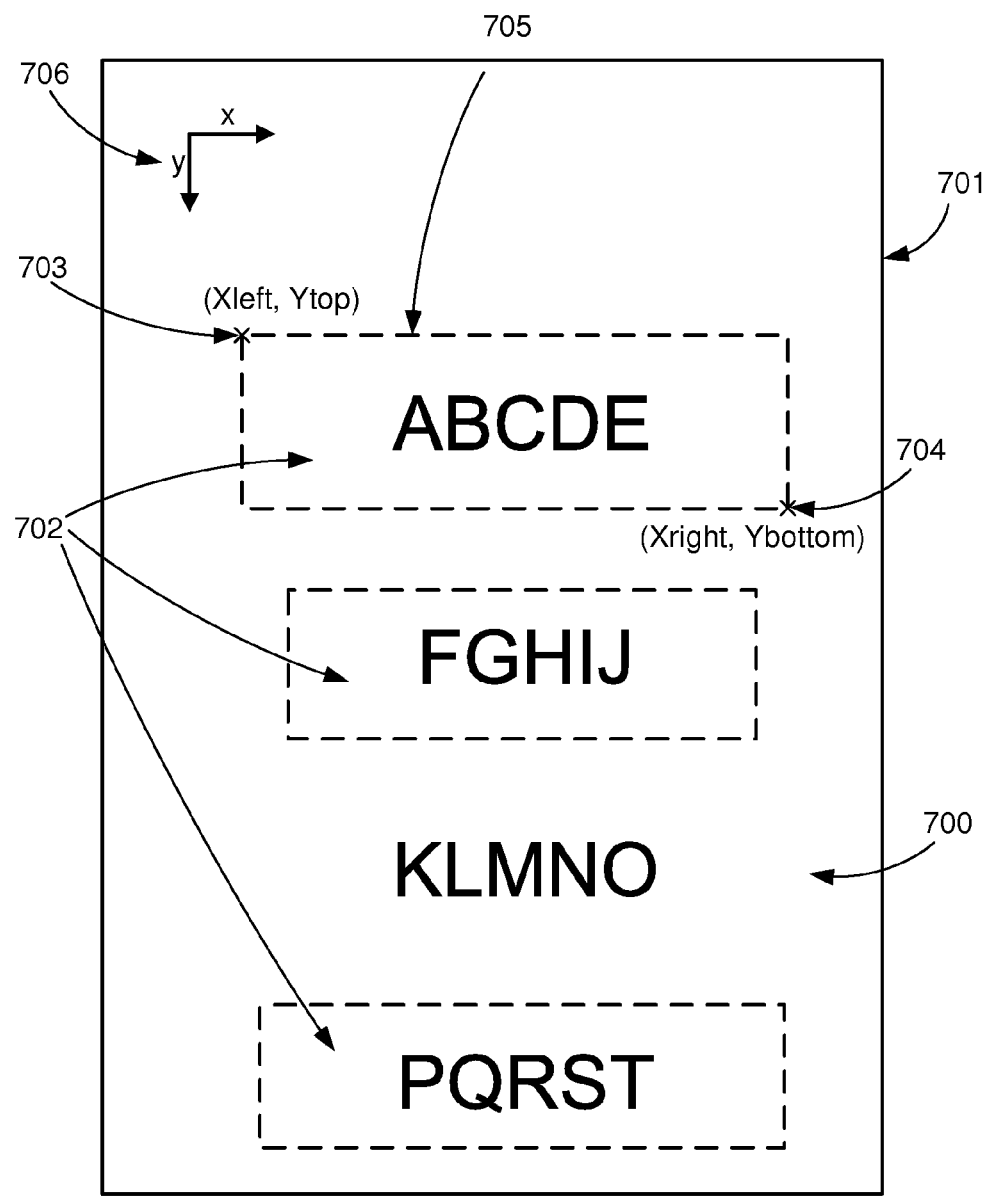
FIG. 7 is a schematic block diagram illustrating a self-contained document, having content, a number of regions and a coordinate system.

A process for encoding a self-contained document 510 is shown in FIG. 1. A specific example 701 of a self-contained document 510, is shown in FIG. 7.

FIG. 1 shows a process 100 for encoding a self-contained document. The process 100 is preferably computer-implemented or implementable as part of the application program 1433 executing or executable on the computer module 1401. The process may be adjunct to a document generation application, such as a word processing application which generates an electronic document within the computer 1401 and which then imposes the encoded barcode into the electronic document for subsequent reproduction via printing. The process 100 has an entry step 110, followed by step 120 where arbitrary information is generated for the self-contained document 510. Step 120 involves collecting any information from a user generating the self-contained document 510 which defines the location of regions, region content, instructions for the processing of regions and otherwise. This, for example, may be an output of a word processing application, specified in a custom Extensible Markup Language (XML) document stored with the document, or be specified by a purpose built document mark-up GUI. In a preferred implementation, the use case chosen is one in which a user creates an anti-tamper document. In such an implementation, the arbitrary information may be formed by location data 703 and 704, either individually or in combination, defining regions 705 to be protected on the page 701, as well as a representation of the content 702 of those regions 705, which is intended to be verified on decoding of the self-contained document 701, 510. Of course, other use-cases are possible.

The coordinates of the location data 703 and 704 of the regions 705 are generally described in units of virtual grid cells 501, as the coordinate system (which will be described at a later point) is only able to provide a unique identity (ID) (and hence coordinate) for each nominal point 503 on the virtual grid 505.

Figure 8:
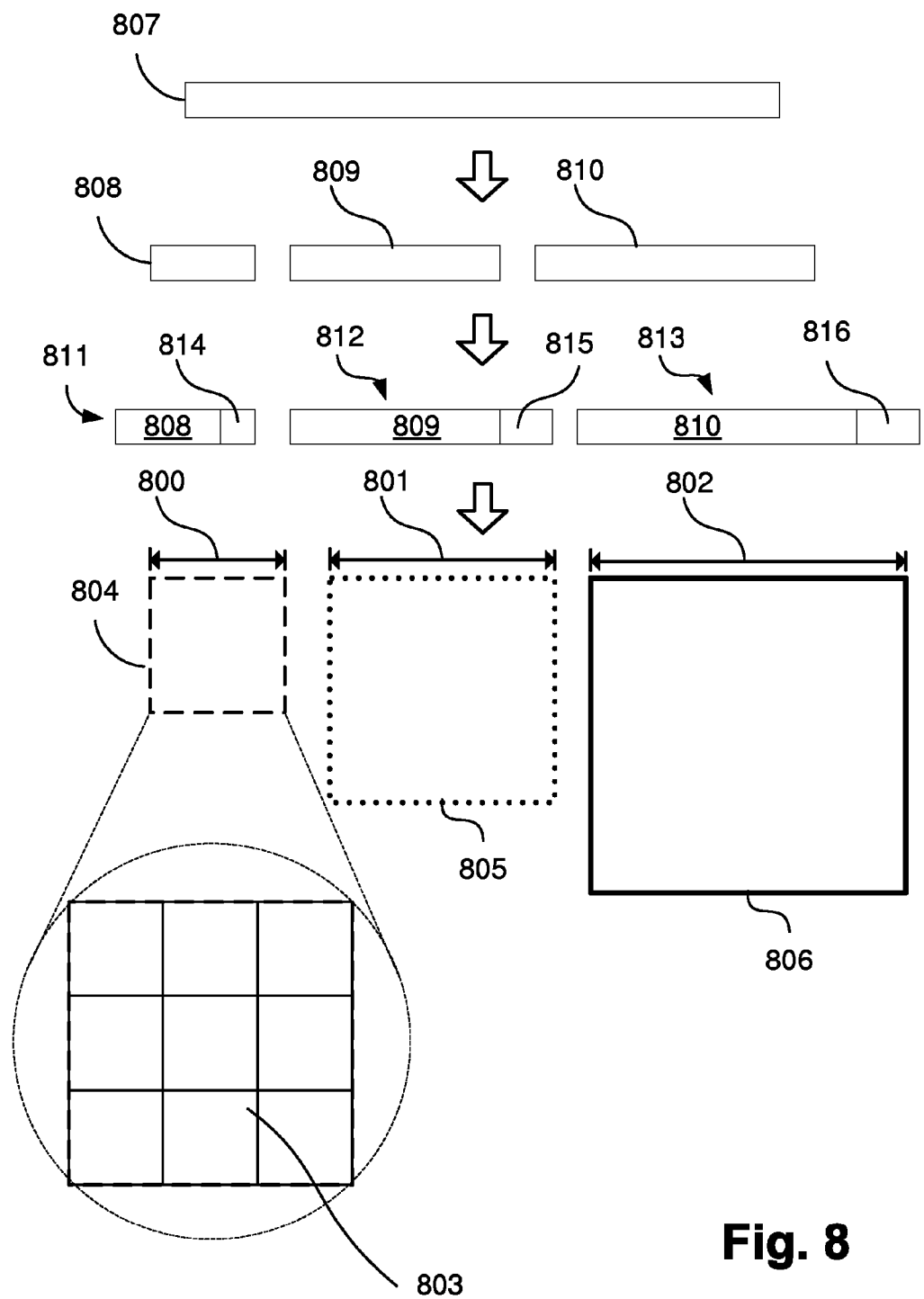
FIG. 8 is a schematic block diagram of a scheme to separate a block of data into blocks which can be used to establish a coordinate system.

After all the necessary information is collected, step 120 operates such that the processor 1405 converts the collected arbitrary information to binary data, forming binary arbitrary information 807, seen in FIG. 8, to be encoded in the 2D barcode 514 in subsequent steps of the process 100. The binary arbitrary information 807 may be stored by the processor 1405 in the HDD 1410.

The process 100 then proceeds to step 140 where the binary arbitrary information 807 is split into two-dimensional blocks 804, 805, and 806 for tiling across the 2D barcode 514 and hence the self-contained document 510. The step 140 is described in detail as a process 300, seen in FIG. 3. The process 300 begins at a step 310 and then proceeds to step 320 where the properties of the binary arbitrary information 807 and the properties of the self-contained document 510 are used to decide the way in which the binary arbitrary information 807 will be distributed across the 2D barcode 514. As mentioned earlier, a coordinate system 511 is established across the self-contained document 510 by arranging the binary arbitrary information 807 in such a way that a coordinate system 511 is inferable.

Figure 9:
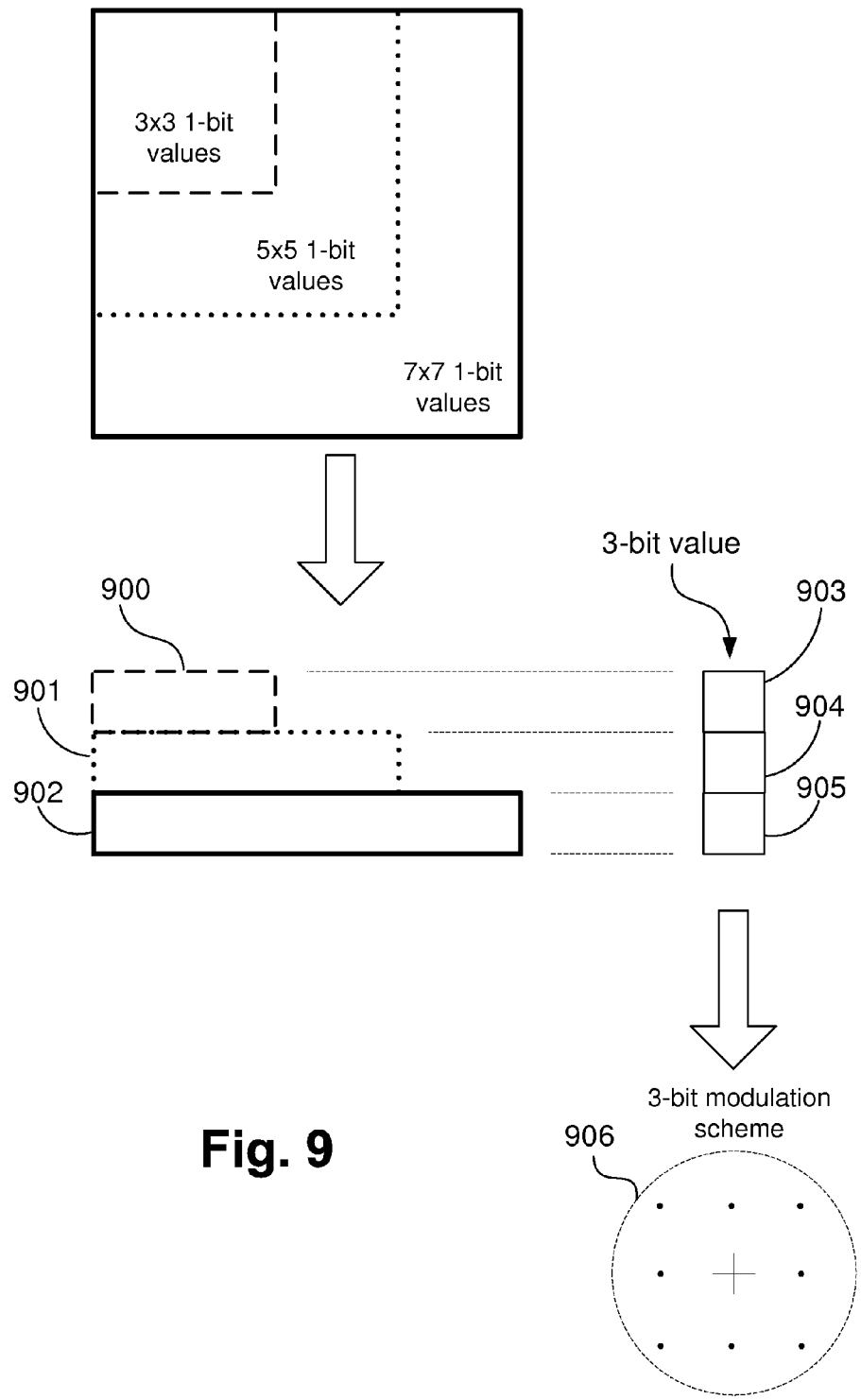
FIG. 9 is a schematic representation of a scheme to distribute overlapping blocks of data into a two-dimensional dot barcode.

The arrangement of the binary arbitrary information 807 is shown in detail in FIG. 8. Binary arbitrary information 807 is to be ultimately split into a series of rectangular (2D) blocks 804, 805, 806. In a desirable implementation, three square blocks of width 800, 801 and 802 (where size is in units of virtual grid cells 501), with each block having a height equal to its width, are used for simplicity. In FIG. 8, the block 804 is sized at 3×3 units as illustrated at 803, the block 805 is 5×5 units, and the block 806 is 7×7 units, each preferably formed with a 1-bit value. There is no requirement however that the width and height of each block must be equal. The only limit on the number of blocks that can be used, is the number of bits of data that can be encoded in each data dot 602. The bit depth of each data dot 602 (i.e. the number bits of data that can be encoded in each data dot 602, which is preferably constant for all data dots 602 across the page) defines the maximum number of blocks that can be used. A bit depth of 3 bits is used in this example, as evidenced by the 8 alternative modulation positions 603 of FIG. 6, meaning that three blocks can be used. As can be seen in FIG. 9, each block 900, 901 and 902 (corresponding to blocks 804, 805, 806, respectively) is encoded and tiled in a separate bit channel (903, 904 and 905 respectively) of a 3 bit modulation scheme 906, in view of the blocks 804, 805 and 806 each being formed with 1-bit values. It is desirable to have overlapping blocks spread across the 2D barcode 514, and hence the face of document 510. If the sizes of the blocks (i.e. the height or the width) are pair-wise anharmonic, then the offset relationship of the blocks relative to one another can be used to define a coordinate system 511 across the self-contained document 514. The properties which allow this state are that, for integers $n_1, n_2, \ldots, n_k$, which all have a pair-wise anharmonic relationship, and any given residuals $a_1, a_2, \ldots, a_k$, there exists the following set of simultaneous congruences which provide a solution for x:

$$x \equiv a_i (\bmod n_i)\ i=1,\ldots,k \quad \text{(Eq. 1)}$$

Here, 'anharmonic' simply means that, for each pair of tiles in the set of tiles, the size of one tile in the pair must not be an integer multiple of size of the other tile in the pair.

Desirably, the blocks are at least pair-wise anharmonic. In a preferred implementation, a particular subset of pair-wise anharmonic sizes, being pair-wise co-prime tile sizes, are used. This means that for any given pair of tiles in the set of all tiles, the largest common divisor of each of the tile sizes is 1. Using pair-wise co-prime sized tiles, as opposed to pair-wise anharmonic, gives the maximum possible unique addressable space for a given arrangement of tiles. This is due to the fact that while a solution to Eq. 1 exists for both pair-wise anharmonic sets of tiles and pair-wise co-prime sets of tiles, only pair-wise co-prime tiles will provide a unique solution to the equation.

Whilst the illustrated implementations use three block sizes, the arrangements described may be performed with a minimum of two block sizes. Having only two block sizes generally results in relatively large blocks, which may not necessarily tile well across the page to be encoded. The use of three block sizes has been found by the present inventors to afford ease of tiling, whilst maintaining sizes that do not impact upon processing capacity and provide for useful data encoding densities. Four or more block sizes, whilst providing smaller blocks that are relatively easy to tile, can significantly increase the computational burden.

The blocks need not be formed with single bit values, as is the case illustrated in FIGS. 8 and 9. For example, where three block sizes are used, two of those blocks may be encoded with 2-bit values. This provides for 5-bits across the tiling to be used for encoding, thereby permitting a 5-bit modulation of dots about a grid position in the barcode.

Using a pair-wise co-prime overlapping tiling of the blocks in the 2D barcode 514 will give a unique coordinate for each virtual grid cell 501 on the self-contained document 510, up to a maximum addressable space of n, where n is defined as below.

$$n = \prod_{i=0}^{k} n_i \quad \text{(Eq. 2)}$$

That is, by taking the block sizes 800, 801 and 802 as $n_i$ in Eq. 1, the offset of any given virtual grid cell 501 into a block as $a_i$ in Eq. 2, then the coordinate of that virtual grid cell 501 is given by x in Eq. 1. These properties can be used to establish x and y coordinates for the virtual grid cell 501 by using the widths and heights of the blocks 804, 805, 806 as the $n_i$ variable, respectively. Non-pair-wise co-prime block sizes may alternatively be used, however this will not give a unique coordinate set equal to n, but rather, an addressable space equal to the Least Common Multiple (LCM) of $n_i$.

The properties of the document 510 and the properties of the binary arbitrary information 807 dictate the size of the two-dimensional blocks 804, 805, and 806. The widths 800, 801, and 802 of the blocks 804-806 should be such that their product is greater than or equal to the width 512 (in units of virtual grid cells) of the page 510. Likewise, the heights of the blocks 804-806 should be such that their product is greater than or equal to the height 507 in cells of the page. In a preferred implementation, a lookup table is used which lists sets of block sizes which adequately address typical document sizes (e.g. A4, A3, Letter etc.). A suitable set of blocks sizes to address an A4 document, being a preferred document size, at 600 d.p.i with 39.6 pixel dot spacing is 9, 11, 13. That is:

$$\text{page\_height}_{data\_grid\_cells} = (11.69\text{in} \times 600\text{dpi})/(39.6 \text{ pixels}) < (9 \times 11 \times 13 \text{ cells})$$

As page height is greater than width (for A4 being 11.69 inches vs. 8.26 inches) and square blocks are being used, the block sizes will also allow the coordinate system 511 to suitably cover the document in the x (width) direction as well.

While the selection of these blocks will suffice to address the A4 self-contained document 510, the blocks must also suitably contain the binary arbitrary information 807 in each of at least two, and in this instance three, binary arbitrary data sub-blocks 808, 809 and 810. Particularly, the arbitrary information, being typically derived from the location data 703 and 704 or content data 702, and also information from the content 702, are provided in distinct ones of the sub-blocks 808, 809 and 810. For example, a first portion (e.g. location 703) of the arbitrary information may be provided in the first block 808, and a second portion (e.g. location 704) of the arbitrary information in provided in the second block 809. The sub-blocks 808, 809 and 810 are combined with an Error Correcting Code (ECC) 814, 815 and 816, to form part of the block data 811, 812 and 813. An ECC factor (i.e. being the percentage of the block data 811, 812, 813 that can be used to encode the ECC 814, 815, 816) should be chosen for each block based on known properties of the data channel. The ECC parts 814, 815 and 816 provide a verification mechanism for decoding operations to ensure data to be encoded into the blocks 804, 805 and 806 can be reliably decoded. Whilst the present implementation uses ECC, any set of rules known mutually by the encoder and decoder may be alternatively used to provide a decode verification mechanism.

In a preferred implementation, an ECC factor of 10% or 0.1 is used (i.e. 10% of the available data will be used for ECC). With the ECC factor chosen, the ECC data 814, 815 and 816 can then be generated from the arbitrary block data 808, 809 and 810 (respectively). It is therefore possible to verify that the binary arbitrary information 807 will fit into the block arrangement, given the chosen block sizes, by examining the following inequality:

$$\left(\sum_i \text{block\_size}_i^2 (1-0.1)\right) >= \text{auxillary\_data\_size}$$

If the inequality equates to false then the next (larger) set of blocks in the lookup table should be tested against the inequality until a suitable set of block sizes is found. This may either be a dynamic process which is performed each time a document is encoded (for example, with the decision regarding block size encoded in an extra channel of data in the 2D barcode 514), or there may simply be a maximum binary data capacity configuration for each document size. To reduce computational overhead, a preferred implementation employs the latter configuration.

The process 300 then proceeds to step 330 where the binary arbitrary information 807 is split or apportioned by the processor 1405 into the arbitrary data sub-blocks 808, 809 and 810 so that each portion of arbitrary information will constitute part of the three blocks of block data 811, 812 and 813.

Each arbitrary data sub-block 808, 809, 810 is error corrected by the processor 1405 using the error correction factor chosen in step 320. Desirably, a Low Density Parity Check (LDPC) is used for the ECC 814, 815, 816 and is appended to each of the arbitrary data sub-blocks 808, 809, 810, forming the block data 811, 812, 813. LDPC codes are well known to those skilled in the art and need not be described here.

The process then proceeds to step 340 where the processor 1405 arranges the block data 811, 812, 813 into the series of two-dimensional blocks 804, 805, 806 to be tiled to form the 2D barcode 514. The ith block of block data is arranged into a (tile_size$_i$×tile_size$_i$) size two-dimensional block of values or intervals. Each interval preferably includes one bit of data, based on the bit depth of each virtual cell 501 in the 2D barcode 500. Each of the 2D blocks 804, 805, 806 are thus arrangements of the data 811, 812, 813. The 2D blocks are 2D arrays of n-bit values, preferably 1-bit values, or 'intervals'. The arranging may be performed in any predetermined and thus reproducible manner. One way of arranging the block data into the 2D blocks is reading bits out of the blocks 811, 812 and 813 in raster order. For example, 9 bits from selected from the block 811 can be inserted into the 2D block 804 in raster order, and similarly 25 bits from the block 812 can be inserted into the 2D block 805 in raster order, and 49 bits from the block 813 may be inserted into the 2D block 806 in raster order. Alternate orders may be used.

The process 300 then ends at step 350.

The process 100 then proceeds to step 150 where the processor 1405 operates to tile each of the two-dimensional blocks 900, 901, 902 in separate channels 903, 904, 905 of the dot barcode 514. 'Encoding' occurs when each of these 2D blocks is tiled across the page, with each interval 'overlapping' a cell in the barcode. Each cell aggregates the bits from each tile and encodes those bits into the barcode dot of the cell. This process effectively modulates a carrier (the dots) by information, and thus encodes the information. As described earlier, each data dot 906 is capable of encoding 3 bits of data. By segmenting the capacity of the data dot into three separate channels 903, 904, 905, it is possible to encode a tiling of each of the separate two-dimensional blocks 900, 901, 902 in a separate, discrete channel. That is, in a preferred implementation, the first block 900 is encoded in the first channel 903, the second block 901 is encoded in the second channel 904 and the third block 902 is encoded in the third channel 905, of the 2D barcode 514. This provides the self-contained document 510 with an overlapping tiling of the three two-dimensional blocks 900, 901, 902 across the dot barcode 514.

Figure 10:
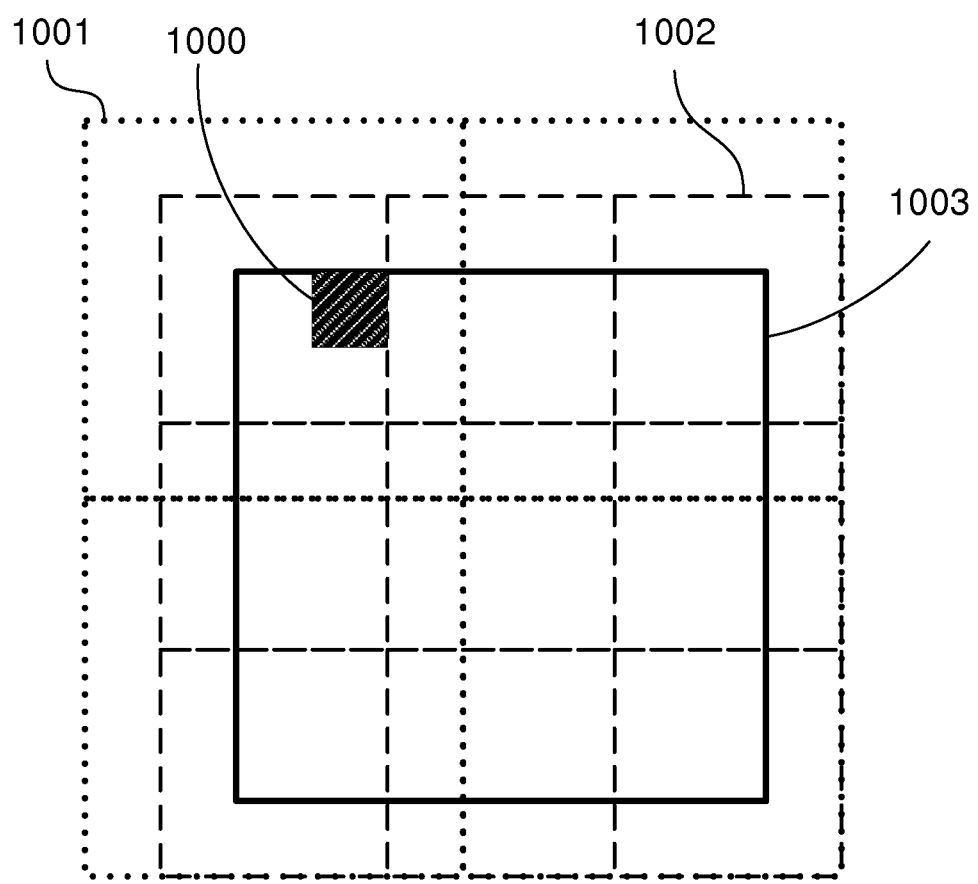
FIG. 10 is a schematic representation of a tiling of overlapping blocks of data which establishes a coordinate system across a self-contained document.

The overlapping tiling is shown in detail in FIG. 10. With the overlapping tiling of each of the two-dimensional blocks 1001, 1002, 1003 overlaid onto the 2D barcode 510, any given virtual cell 501 occupies a cell 1000 in each of the two-dimensional blocks 1001, 1002 and 1003. Each virtual grid cell 501 is assigned an interval based on the three one-bit values from each of the cells in the two-dimensional blocks 1001, 1002, 1003 the grid cell 501 (1000) occupies. The aggregate of these values forms the three bit interval to be encoded in the virtual grid cell 501. The method for packing the three bits into the interval is arbitrary but must be consistent between the encoding and decoding of the 2D barcode.

The process 100 then proceeds to the step 160 where the intervals calculated are used by the processor 1405 to modulate the position of each data dot 502 in the virtual grid 505. As described earlier, values are encoded into the data dots 602 by modulating the dot away from a nominal position 601 to one of a number of set positions. As explained above, there are desirably eight set positions 603, with each corresponding to one of the data values 0-7. The three bits of each interval for each virtual cell map to this range of values, allowing one virtual cell's interval to be encoded in each dot. The interval for each virtual cell 604 was calculated in the step 150. Each data dot 502 in the dot barcode 500 is modulated according to its interval and is then placed on the document. The process concludes at a step 170 where typically the document is stored to computer memory 1406 or 1410. The document may then be printed using the printer 1415, such as a Multi Function Printer (MFP), or otherwise (e.g. printed electronically to a portable document format—PDF), and distributed for use.

The decode verification mechanism afforded in the described implementation by an ECC operates in two ways in the protected document. Firstly, where the ECC is based upon the coordinate location of content of the document (e.g. 703, 704), the ECC defines rules of how the arbitrary information (content) is laid out in the document. This permits inferring the location of tiled block from the ECC and any overlapping tiles. The Use of the ECC therefore gives information about the coordinate system. This contrasts traditional approaches where the coordinate system is explicitly encoded into the tiles. Secondly, in anticipation of decoding, the ECC provides for correcting the content of the tile and the tile position. In the described implementations, the ECC is effective as it is formed using the arbitrary information that is being encoded. Note that "arbitrary data" is distinct from "arbitrary information", since the later asserts "information", being something that is usefully interpretable. Further, upon decode, the use of ECC provides a mechanism by which the arbitrary information can be checked to conform with certain properties (i.e. the inverse of the ECC coding). The act of 'verifying decode', which is to be described, includes checking that the ECC code checks out against the arbitrary information. The intention is to identify the location of each of the tiles by iteratively trying different offsets until the ECC checks out, hence 'verifying' the offset of the tile.

Decoding a Self-Contained Document

A preferred approach for decoding the self-contained document 510, created as described in the section 'Encoding a Self-Contained Document', will now be outlined. In a typical use case, the hard-copy self-contained document 510 will have been distributed to a second user, different from the first user who originally encoded the self-contained document 510. The second user will wish to decode the self-contained document 510 and recover the coordinate data and arbitrary information to perform a workflow step on the self-contained document 510. Typically, this workflow step generally includes verifying that the content 702 of the self-contained document 701 has not been tampered with. This involves recovering the arbitrary information and the coordinate information, typically by scanning the document 510 using the scanner 1426 and storing the scanned image in the memory 1406 of the computer 1401. The arbitrary information in this example may be composed of a representation of the content 702 within the regions 705 of the self-contained document 701 and information of the region location (i.e. sets of (x,y) coordinates 703, 704) within the coordinate system 706. Once recovered, the coordinate information is used to associate the representations of the content 702 with the regions 705 on the document. The regions 705 and their representations are then compared to generate anti-tamper information.

Figure 2:
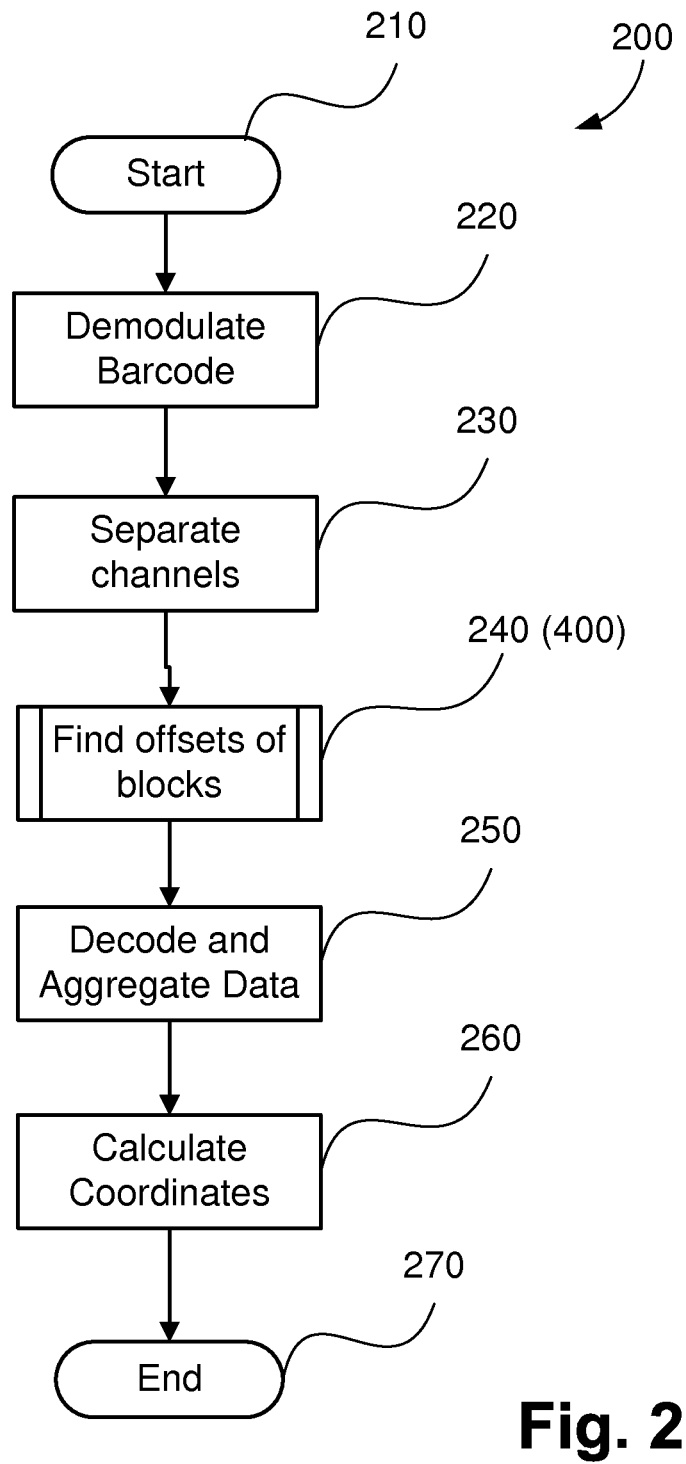
FIG. 2 is a schematic flow diagram illustrating a method of decoding a self-contained document.
Figure 3:
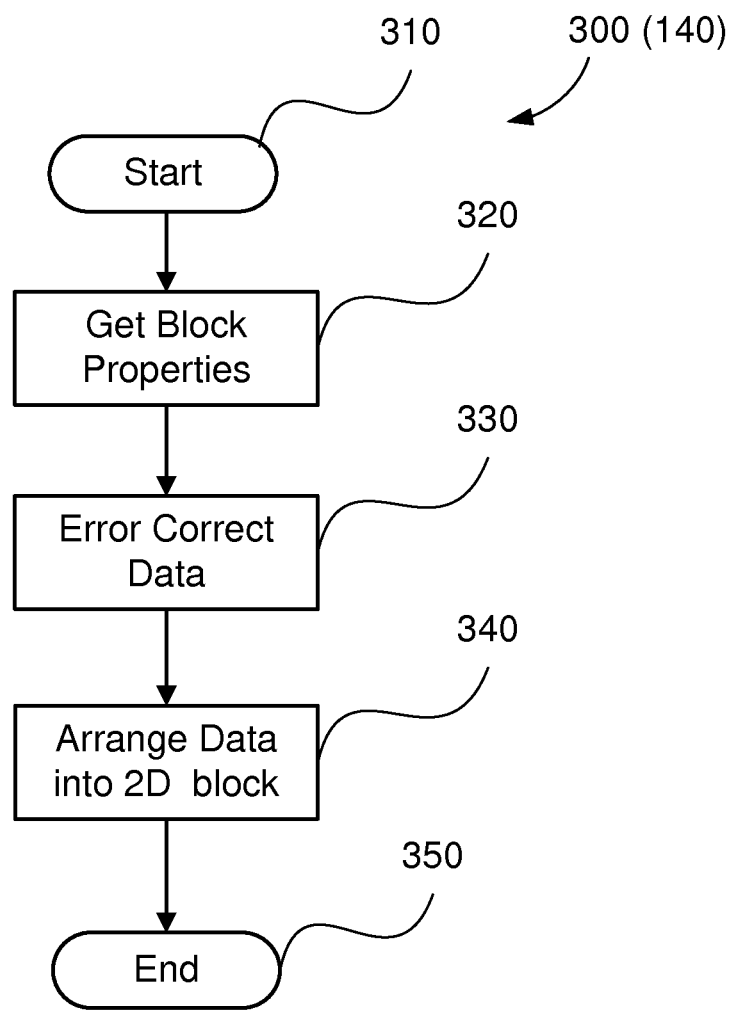
FIG. 3 is a schematic flow diagram illustrating a method of arranging data in a two-dimensional barcode to establish a coordinate system.
Figure 11:
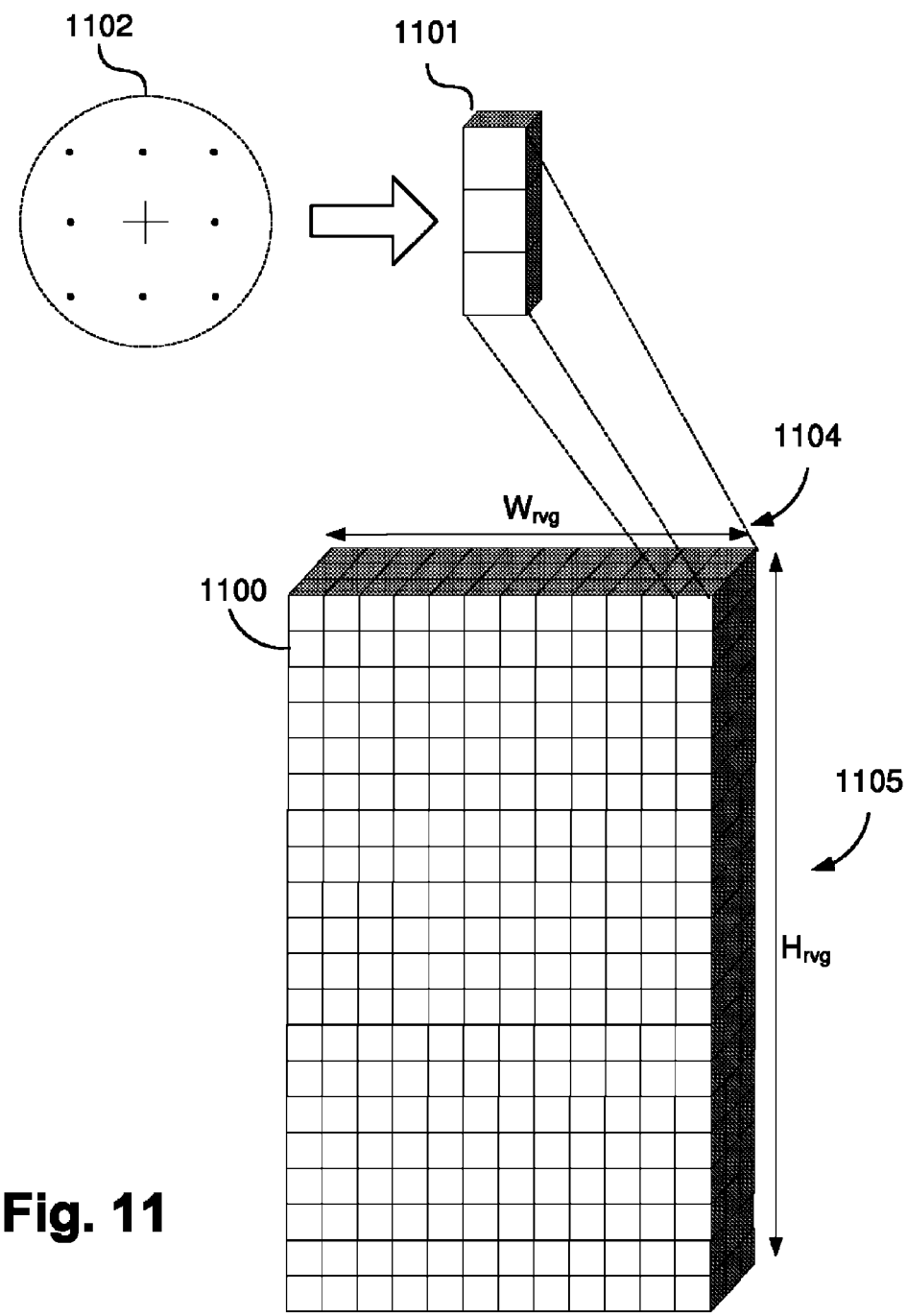
FIG. 11 is a schematic representation of a recovered grid of cells.
Figure 12:
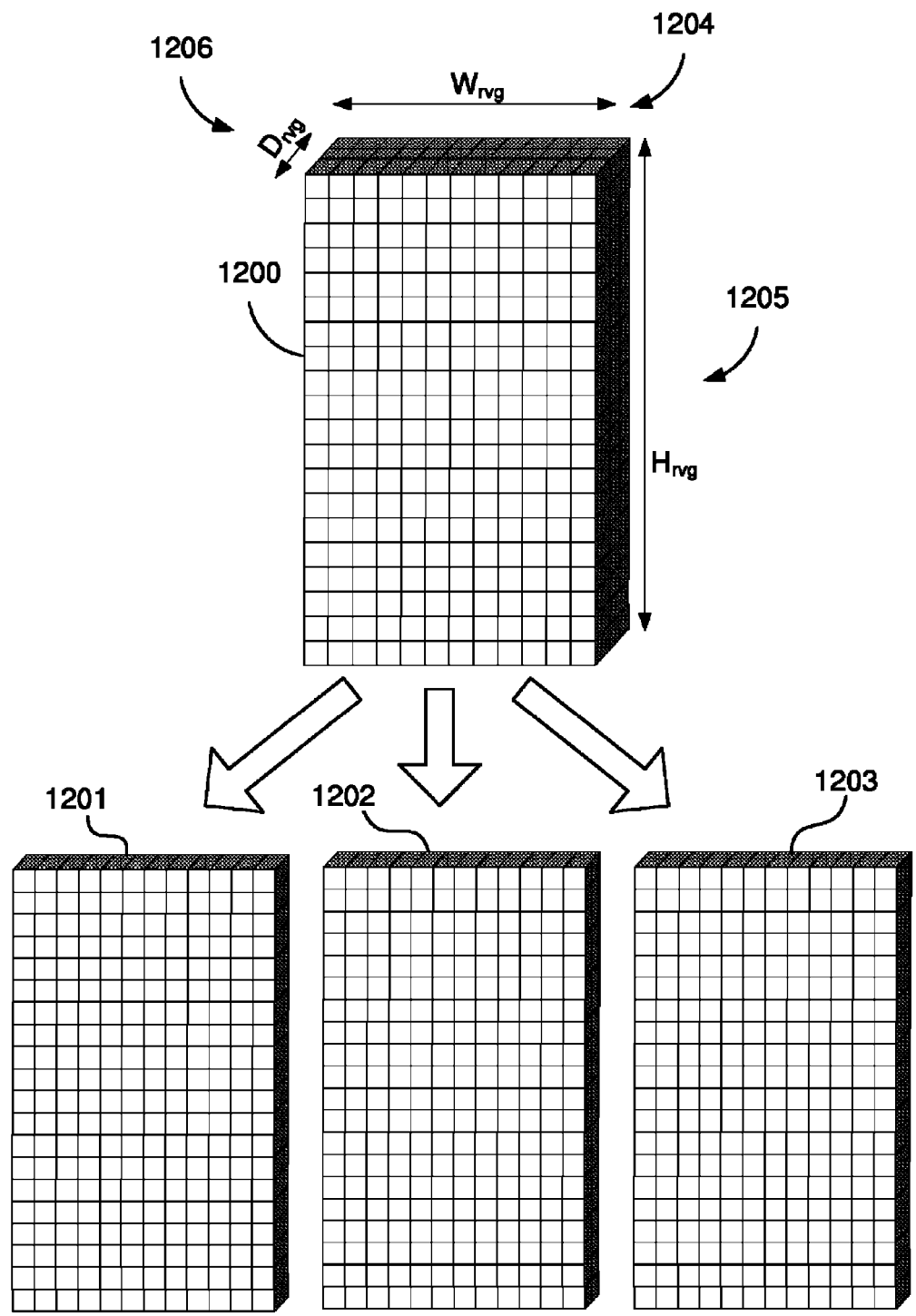
FIG. 12 is a schematic illustrates a recovered grid of cells separated into its constituent channels.

The process for decoding a self-contained document 510 is shown in FIG. 2 and may also be executed within the computer 1401 by the processor 1405 operating upon scanned image data, stored in the memory 1406, and obtained from the scanner 1426 scanning the document 510. The process 200 begins at a step 210 and then proceeds to step 220 where the processor 1405 operates to decode and thus recover data from the barcode. In a preferred implementation, the data is recovered by re-establishing the virtual grid 505 in the dot barcode 500 and then demodulating the data dots 502 to reconstruct an array 1100 of grid cells 1101 containing intervals, as seen in FIG. 11. Using heuristics, the orientation and spacing of the virtual grid 505 is calculated. This information is used to establish the recovered virtual grid 505 used in the encoding step. The heuristics that may be used are well documented in the prior art and include, for example, constellation detection, which grows a grid out from a number of seed points based on the known arrangement of alignment dots 606. Once the virtual grid 505 is reconstructed, and its spacing and orientation is known, the nominal position 503 of each data dot 502, and consequently, the offset of the data dot 502 from its nominal position 503, can be calculated. As described in the encoding step, the offsets of the data dots 602 from their nominal positions 601 map directly to an interval value via the modulation scheme shown in FIG. 6. All the data dots 1102 are mapped back to their encoded 3-bit intervals, and a recovered virtual grid 1100 of recovered virtual cells 1101 is generated.

The process 200 then proceeds to step 230 where the intervals in the recovered virtual grid are separated into their constituent channels. The recovered virtual grid 1100 as seen in FIG. 11 forms a two-dimensional array of intervals of width $W_{rvg}$ 1104 and height $H_{rvg}$ 1105. The virtual grid 1100 may also be viewed as a three-dimensional array 1200 of single bit values, with the third dimension of $D_{rvg}$ 1206 which is equal to the bit depth of the recovered virtual cells in the recovered virtual grid 1100. As noted above, this bit depth is desirably equal to three. In the step 230, the three-dimensional array 1200 is split along the depth dimension 1206 into three two-dimensional bit arrays 1201, 1202 and 1203.

The process 200 then proceeds to step 240 where each of the two-dimensional bit arrays 1201, 1202, 1203 are processed to recover the locations of the two-dimensional blocks 804, 805, 806 which were tiled across each channel in the encoding step.

Figure 4:
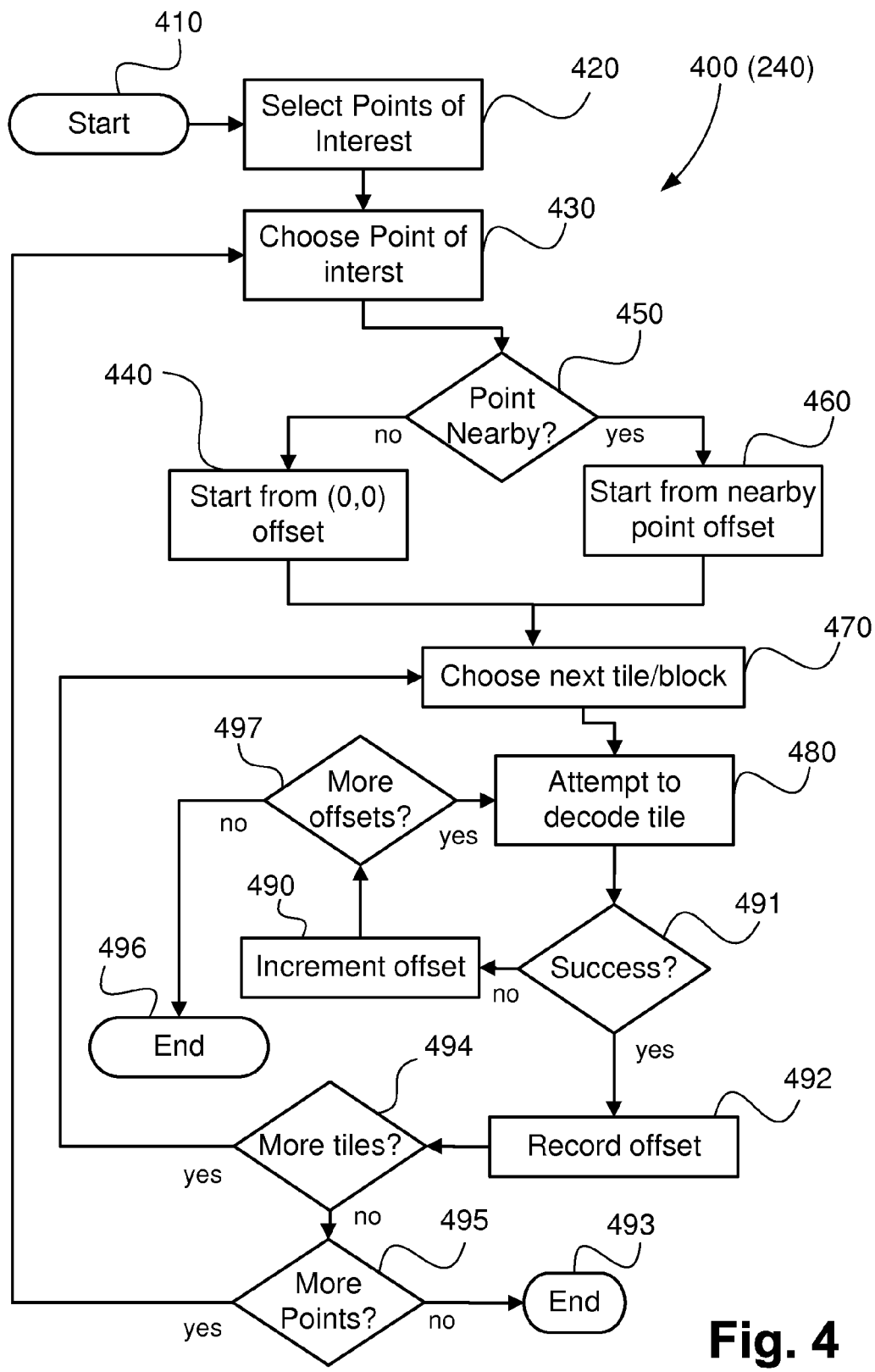
FIG. 4 is a schematic flow diagram illustrating a method of recovering coordinate information from a self-contained document.

Step 240 is described in detail as a process 400 in FIG. 4. The process 400 begins at step 410 and proceeds to step 420 where a set of points of interest are selected by the processor 1405. Points of interest are virtual grid cells 1101 from which a search for the location of each of the two-dimensional blocks is to begin. The optimal spacing of the points of interest in each of the x and y directions depends on the size of the blocks. A good number is generally four times the smallest block dimension in that direction. The points of interest are added by the processor 1405 to a queue, for example formed in the memory 1406, for use in subsequent steps.

Figure 13:
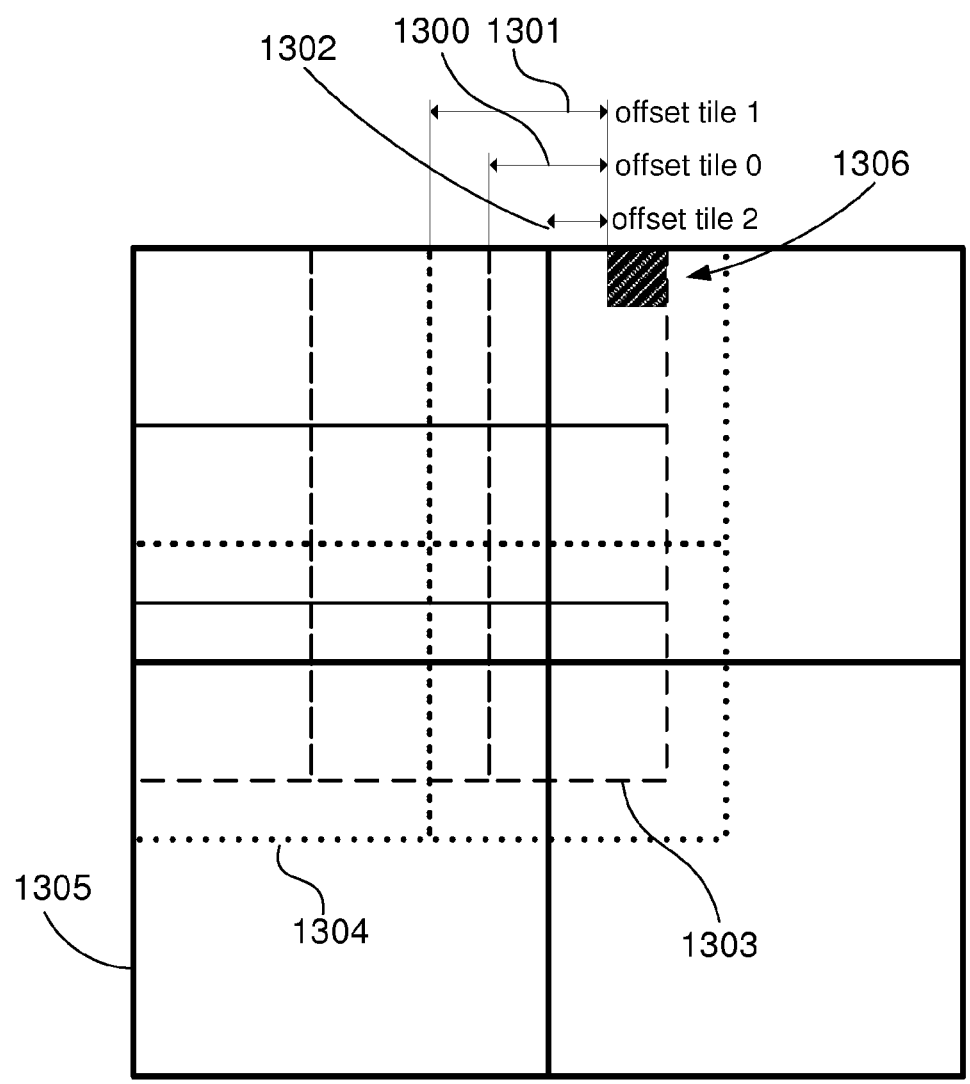
FIG. 13 is a schematic representation showing a tiling of blocks of data in the recovered grid of cells.

The process 400 then proceeds to the step 430, which is described with reference to FIG. 13. In step 430, a single point of interest is taken from the queue so that corresponding offsets 1300, 1301, 1302 can be calculated within the set of two-dimensional blocks 1303, 1304, 1305 associated with a cell 1306. There are a number of methods for choosing the next point of interest to take from the list. However, in the preferred implementation, points are taken in raster order across the recovered virtual grid.

The process 400 then proceeds to the step 450 where a decision is made. If at least one point of interest has been already been successfully processed, and is within a predefined neighbourhood of the current point of interest, then the process 400 proceeds to step 460. There are a number of possible choices for the size of the neighbourhood. The preferred implementation uses a square neighbourhood, the sides of which are three times the size of the largest block (in units of grid cells). The offsets calculated for the previously processed point of interest within the two-dimensional blocks are assigned as the initial estimate of the offset of the current point of interest within the two-dimensional blocks. If there are multiple processed points of interest in the predefined neighbourhood, then the closest of the candidate processed points of interest is chosen. The closest distance here is determined as the Euclidean distance in recovered virtual grid cells from one point of interest to another. If no previously calculated point of interest falls within the neighbourhood of the current point of interest, or no previously calculated point of interest exists (i.e. a first iteration of the process 400) then (0,0) is chosen as the first estimated offset of the current point of interest within each of the two dimensional blocks.

Each of steps 440 and 450 are followed by step 470 where a two-dimensional block is chosen from the set of two-dimensional blocks 1300, 1301 and 1302. The order in which the two-dimensional blocks are processed is not important.

The process then continues to step 480 where a decoding attempt is made on a (block_$h_i$×block_$w_i$) block of virtual cells (where block_$h_i$ is the height of the current two-dimensional block and block_$w_i$ is the width), the top left of the block being offset from the point of interest by the estimated offset.

The decoding attempt is performed as follows. A two-dimensional block of single bit values is extracted from the channel to which the two-dimensional block belongs. In this description, extraction of the first block 1300 from the first channel 1201 will be described, however the steps are repeated for extracting the second block 1301 from the second channel 1202, and the third block 1302 from the third channel 1203. The extracted two-dimensional block is then unpacked into a one-dimensional block of extracted data. This block may possibly constitute the block data 811 encoded earlier. However, given that the extracted two-dimensional block was taken from an arbitrary location in the channel (at the estimated offset from the current point of interest) there is a good chance that it is in fact a shifted version of the block data 811 (i.e. the estimated offset is incorrect). It can be confirmed that the block of extracted data corresponds to the original block data by attempting to perform error correction on the data using the decode verification mechanism, which in this case the encoded ECC 814. In a preferred implementation, a LDPC code is added to the end of the arbitrary data sub-block 808. While LDPC codes do not give a hard fail notification, a heuristic decision can be made as to whether a LDPC corrected block of data is likely to decode based on the rate of convergence of the error correcting process. Means for making this decision are well known in the art. This check is performed in step 491, which assesses or tests for and indicates success of the tile decoding.

If the block is not successfully decoded, then the estimated offset is updated in step 490 to a new estimated offset. A check 497 is then performed. If ($x_{off}$, $y_{off}$) is the current offset estimate, then $x_{off}$ (in the width direction) is decreased by one and its modulus base block_$w_i$, is taken. If this results in the $x_{off}$ being equal to the starting estimate of $x_{off}$ for the current block, then $y_{off}$ is decreased by one and its modulus base block_$h_i$, is taken. If this results in the $y_{off}$ being equal to the starting estimate of $y_{off}$, then the process 400 terminates at step 496. This signifies that the process 400 was not able to find a suitable offset for the current point of interest. Where at least one offset is found, the process 400 repeats steps 480, 491 and 490 until a success is signalled at step 491 or until the process terminates at 496.

If the block of extracted data successfully decodes then the process 400 proceeds to a step 492 where the estimated offset which allowed a successful decoding, being the two-dimensional block offset for the current block, is recorded in the memory 1406 as the offset for the current point of interest.

The process 400 then proceeds to a decision 494 where a check is performed to see whether there are any more tiles/blocks to be processed. If there remain one or more blocks whose offsets have not been calculated for the current point of interest, then one of the remaining blocks is set as the current block and steps 470 through to 494 are repeated for the new current block.

If there are no blocks remaining then the process 400 proceeds to a decision 495 where a check is performed to see whether there are more points of interest to be processed. If there are more points of interest then the steps 430 through to 495 are repeated for each of the points of interest.

If there are no more points of interest to be processed (i.e. each of the block offsets for each of the points of interest have been calculated) then the process 400 terminates at a step 493.

The process 200 then proceeds to step 250 where the original block data encoded in each two-dimensional block is recovered. Firstly, points of interest (POI) are grouped based on two-dimensional block offsets. Points of interests whose two-dimensional blocks have identical phase are grouped together into POI bins as they are likely to be points within the same contiguous barcode. Points of interests whose two-dimensional block offsets do not agree are likely to belong to separate dot barcodes that are occupying the same document. This may occur when a malicious user has pasted one barcode over another as a form of attack, and hence should be processed separately. For each POI bin, a single point of interest, is chosen, and for each two-dimensional block, a (tile_$w_i$× tile_$h_i$) sized block of data is extracted from the recovered virtual grid, where tile_$w_i$ and tile_$h_i$ are the width and height of the ith block, respectively. The block is extracted from a location corresponding to the cell location of the point of interest plus the offset calculated in step 240. The extraction and decoding of this block will have already been performed in step 240, and if the decoded information (i.e. the recovered arbitrary information) has been stored, then there is no need to perform any further processing at this step. The recovered arbitrary information can simply be passed back to the user. Recall that the objective of step 240 is simply to find offsets of blocks and not to recover the arbitrary information, although the recovered arbitrary information is recovered as an artefact of the offset finding process. If the offsets of the blocks were discarded, then the recovered arbitrary information may be generated once again using the error correcting process outlined in step 480, and then the recovered arbitrary information may be output to the user.

The process 200 then proceeds to a step 260 where the offsets calculated in step 240 are used to establish a coordinate system across the face of the self-contained document 510. As described earlier, the pair-wise co-prime sizes of the blocks allow a coordinate system to be inferred across the surface of the self-contained document 510. As the offset of the point of interest into each of the blocks is known from the step 240, a unique (x,y) coordinate can be calculated for the point of interest using the Chinese Remainder theorem (CRT).

If the x coordinate is denoted by x, the block widths by $n_i$, and the offset of the point of interest in each respective block by $a_i$, then based on the CRT, the x-coordinate is given by:

$$x \equiv a_i (\bmod n_i)\ i=1,\ldots,k$$

with $$n = \prod_{i=0}^{k} n_i$$

This set of congruencies give us the following:

$$rn_i + sn/n_i = 1$$
$$i = 1, \ldots, k$$
$$e_i = sn/n_i$$
$$x = \sum_{i=0}^{i=k} a_i e_i$$

Each $e_i$ may be found by using the Extended Euclidean Algorithm for solving Bezout's Identity:

$$ax+by=gcd(a,b)$$

The same process may then be repeated to find the y coordinate, using the heights of the blocks (block_$h_i$) for $n_i$, and the y offsets of the point of interest as $a_i$.

By repeating this process for each of the points of interest, a unique coordinate may be calculated for each point of interest. For a group of points of interest where there is a considerably high degree of confidence that all points belong to the same dot barcode, the absolute coordinates of two points of interest are sufficient to infer the coordinates of the rest of the recovered virtual grid to which they belong.

Once a coordinate system has been established, the locations 703 and 704 of the regions 705 may be inferred by combining the information encoded in the arbitrary information with knowledge of the coordinate system. In the preferred implementation, this step makes it possible to compare the representation of the content 702 encoded in the arbitrary information 807 with the content on the decoded document thereby affording a verification mechanism useful for decoding of the barcode information. This allows a user to verify that the content of the self contained document 510 is still in an original state, and has not been altered, maliciously or otherwise.

INDUSTRIAL APPLICABILITY

The arrangements described are applicable to the computer and data processing industries and particularly for the formation of unique barcodes and their verification after recovery from documents.

The foregoing describes only some embodiments of the present invention, and modifications and/or changes can be made thereto without departing from the scope and spirit of the invention, the embodiments being illustrative and not restrictive.

I claim:

1. A computer-implemented method for encoding information in a barcode, the barcode comprising a plurality of blocks arranged to define a coordinate system across the barcode, said method comprising:

determining sizes of at least first and second blocks into which the information is to be encoded such that the blocks have a pair-wise anharmonic relationship with each other and have a total size which is larger than or equal to a total size of the information plus associated error correcting data;

selecting a first portion of the information to be encoded in the first block and selecting a second portion of the information to be encoded in the second block;

encoding the first portion of the information in the first block and the second portion of the information in the second block, and providing a decode verification mechanism in each of the first and second blocks;

arranging a plurality of the encoded first blocks and a plurality of the encoded second blocks to form a barcode and to define a coordinate system therein; and storing the barcode to a memory device.

2. A method according to claim 1 wherein the encoding step comprises:

forming the decode verification mechanism from the information;

arranging the first portion and the decode verification mechanism into the first block; and arranging the second portion and the decode verification mechanism into the second block.

3. A method according to claim 2 wherein the decode verification mechanism has at least a first part and a second part, and the first part is arranged with the first portion into the first block and the second part is arranged with the second portion into the second block.

4. A method according to claim 3 wherein the first part is determined from the first portion and the second part is determined from the second portion.

5. A method according to claim 4 wherein the decode verification mechanism comprises error correction data determined for each of the selected first and second portions of the information.

6. A method according to claim 2 wherein the decode verification mechanism comprises error correction data determined from the information.

7. A method according to claim 6 wherein the information is formed from at least one of location data of at least one region of a document to be protected with the barcode, and content of at least one such region.

8. A method according to claim 7 wherein the information is formed as information data from a combination of plural location data of at least one said region and content of said one region, and associated with the portions of information is a corresponding error correction code for arranging in respective ones of the blocks.

9. A method according to claim 1 wherein the blocks are sized to be pair-wise co-prime.

10. A computer-implemented method for decoding information and determining coordinate information in a barcode comprising a plurality of blocks, the barcode being formed on a document, said method comprising:

decoding from an image of the document at least a portion of the barcode using a decode verification mechanism to recover information in a first block and second block of the barcode;

determining an arrangement of a plurality of the first blocks and a plurality of the second blocks based on the position of the decoded first block and the position of the decoded second block; and determining coordinate information using the position of each first block relative to a respective second block and an anharmonic relationship of the blocks.

11. A method according to claim 10 wherein the position of each decoded first block is an offset from the position of a respective decoded second block.

12. A method according to claim 10 wherein the decoding step comprises:

demodulating the barcode to recover a virtual grid associated therewith;

separating the virtual grid of the demodulated barcode into a plurality of channels; and recovering locations of the blocks tiled across each of the channels.

13. A method according to claim 12 wherein the recovering step comprises, for each block of the barcode:
 (i) identifying a point of interest to establish an offset;
 (ii) selecting a block associated with the established offset;
 (iii) decoding the selected block and assessing the decoding using the decode verification mechanism;
 (iv) where the decoding is successful, recording the offset for the block; and
 (v) where the decoding is not successful, updating the offset and repeating step (iii).

14. A method according to claim 13 wherein the determining of the arrangement and of the coordinate information is based upon the determined offsets.

15. A computer-implemented method for encoding information in a two-dimensional (2D) code, the 2D code comprising a plurality of blocks arranged to define a coordinate system across the 2D code, said method comprising:
 selecting a first portion of the information to be encoded in a first block and selecting a second portion of the information to be encoded in a second block, corresponding to sizes of the first and second blocks into which the information is to be encoded such that the first and second blocks have an anharmonic relationship with each other;
 encoding the first portion of the information in the first block and the second portion of the information in the second block, and providing a decode verification mechanism in each of the first and second blocks wherein the first block and the second block are encoded as a separate bit channel of a 2D code;
 arranging a plurality of the encoded first blocks and a plurality of the encoded second blocks to form the 2D code and to define a coordinate system therein; and
 storing the 2D code to a memory device.

16. A computer-implemented method for decoding information in a two-dimensional (2D) code comprising a plurality of blocks, the 2D code being formed on a document, said method comprising:
 attempting to arrange a plurality of first blocks and a plurality of second blocks wherein each of the first block and the second block is encoded as a separate bit channel of the 2D code, and the first and second blocks having an anharmonic relationship with each other;
 decoding a first portion of the information in a first block and a second portion of the information in a second block;
 verifying at least one of the first portion of the information in the first block and the second portion of the information in the second block using a decode verification mechanism; and
 obtaining the information from the verified first portion of the information in the first block and verified second portion of the second block of the information.

17. An apparatus comprising:
 a processor; and
 a memory containing a program which, when executed by the processor, causes the processor to perform operations for encoding information in a barcode, the barcode comprising a plurality of blocks arranged to define a coordinate system across the barcode, the operations comprising:
 determining sizes of at least first and second blocks into which the information is to be encoded such that the blocks have a pair-wise anharmonic relationship with each other and have a total size which is larger than or equal to a total size of the information plus associated error correcting data;
 selecting a first portion of the information to be encoded in the first block and selecting a second portion of the information to be encoded in the second block;
 encoding the first portion of the information in the first block and the second portion of the information in the second block, and providing a decode verification mechanism in each of the first and second blocks;
 arranging a plurality of the encoded first blocks and a plurality of the encoded second blocks to form a barcode and to define a coordinate system therein; and
 storing the barcode to a memory device.

18. A computer-readable storage medium having a program which, when executed by a processor, causes the processor to perform operations for encoding information in a barcode, the barcode comprising a plurality of blocks arranged to define a coordinate system across the barcode, the operations comprising: determining sizes of at least first and second blocks into which the information is to be encoded such that the blocks have a pair-wise anharmonic relationship with each other and have a total size which is larger than or equal to a total size of the information plus associated error correcting data;
 selecting a first portion of the information to be encoded in the first block and selecting a second portion of the information to be encoded in the second block;
 encoding the first portion of the information in the first block and the second portion of the information in the second block, and providing a decode verification mechanism in each of the first and second blocks;
 arranging a plurality of the encoded first blocks and a plurality of the encoded second blocks to form a barcode and to define a coordinate system therein; and
 storing the barcode to a memory device.

* * * * *